(12) United States Patent
Qian et al.

(10) Patent No.: US 12,334,851 B2
(45) Date of Patent: Jun. 17, 2025

(54) DIRECT DRIVE SYSTEM, CONTROL METHOD FOR THE SAME, ELECTRONIC DEVICE AND STORAGE MEDIUM

(71) Applicant: AAC Technologies (Nanjing) Co., Ltd., Nanjing (CN)

(72) Inventors: Lin Qian, Nanjing (CN); Shun Guo, Nanjing (CN); Xueyuan Zhu, Nanjing (CN); Weiling Shi, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 171 days.

(21) Appl. No.: 18/321,781

(22) Filed: May 23, 2023

(65) Prior Publication Data

US 2024/0178778 A1    May 30, 2024

Related U.S. Application Data

(63) Continuation of application No. PCT/CN2023/080438, filed on Mar. 9, 2023.

(30) Foreign Application Priority Data

Nov. 25, 2022 (CN) .......................... 202211487267.9

(51) Int. Cl.
*H02P 25/064* (2016.01)
*H02K 11/215* (2016.01)
*H02K 41/03* (2006.01)

(52) U.S. Cl.
CPC .......... *H02P 25/064* (2016.02); *H02K 11/215* (2016.01); *H02K 41/031* (2013.01)

(58) Field of Classification Search
CPC .... H02P 25/064; H02K 11/215; H02K 41/031
See application file for complete search history.

(56) References Cited

U.S. PATENT DOCUMENTS

2017/0117829 A1* 4/2017 Yamamoto ................ H02P 6/04
2021/0249943 A1* 8/2021 Yamamoto ............. B65G 43/08

* cited by examiner

*Primary Examiner* — Zoheb S Imtiaz
(74) *Attorney, Agent, or Firm* — Wiersch Law Group

(57) ABSTRACT

The present disclosure provides a direct drive system, a control method for the same, an electronic device and a storage medium. In the direct drive system, the plurality of primary units are designed to have the position mode and the current mode. In the position mode, a position control instruction is output according to the absolute position information of a mover on the guide rails and predetermined positions of the mover on the guide rails, in order for a respective driver to adjust current in at least one winding primary unit according to the position control instruction, to move the respective mover to a predetermined position. In the current mode, a current control instruction is output, in order for the respective driver to provide current to the at least one winding according to the current control instruction, to compensate a thrust loss occurred in movement of the respective mover.

10 Claims, 11 Drawing Sheets

DIRECT DRIVE SYSTEM, CONTROL METHOD FOR THE SAME, ELECTRONIC DEVICE AND STORAGE MEDIUM

CROSS REFERENCE TO RELATED APPLICATIONS

The present application is a continuation of PCT Patent Application No. PCT/CN2023/080438, filed Mar. 9, 2023, which claims priority to Chinese patent application No. 202211487267.9, filed Nov. 25, 2022, each of which is incorporated by reference herein in its entirety.

TECHNICAL FIELD

The present disclosure relates to the field of direct drive transmission technology, and in particular to a direct drive system, a control method for the same, an electronic device and a storage medium.

BACKGROUND

In related technologies, a direct drive transmission system generally includes a plurality of movers, a plurality of stators configured to drive the plurality of movers to move in a predetermined direction in a straight line by generating a magnetic field, and a plurality of drivers each is connected to a respective stator. A conventional control method uses a master-slave switching control to achieve smooth transition of the mover from one stator to another. This control method includes a spindle mode and a slave mode. In the spindle mode, the current in windings of a respective stator is adjusted by a driver to change the thrust on a corresponding mover, thereby changing the position of the corresponding mover. In the slave mode, the current delivered by a driver to windings of a respective stator is unchanged. However, this control method has many drawbacks, for example, the functions of the drivers have to be customized and modified, which affects the universality of the drivers; and during the transition process of the mover from one stator to another, there are periods in which there is only a single master control, which leads to a loss of thrust on the mover.

Therefore, it is necessary to improve the above control method for the direct drive transmission system.

SUMMARY

The present disclosure aims to provide a direct drive system, a control method for the same, an electronic device and a storage medium, which can address the problem that the drivers in the direct drive transmission systems according to the related technologies has poor universality, and the thrust on a mover is prone to loss.

To this end, some embodiments of the present disclosure provide a direct drive system, including: a stator; a plurality of primary units fixed to the stator and arranged along a length direction of the stator, where each primary unit of the plurality of primary units has at least one winding; a plurality of drivers, where each driver of the plurality of drivers is connected to the at least one winding of a respective primary unit; a controller connected to the plurality of drivers; a plurality of first position feedback devices fixed to the stator, where each first position feedback device of the plurality of first position feedback devices is in correspondence to a respective primary unit and connected to a respective driver; guide rails fixed to the stator and disposed on either sides of any primary unit of the plurality of primary units; and a plurality of movers slidably fitted to the guide rails, where each mover of the plurality of movers has at least one magnetic steel and a second position feedback device. The second position feedback device aligns with a respective first position feedback device, and each winding of the at least one winding aligns with a respective magnetic steel.

The at least one winding is configured to generate thrust between the at least one winding and the at least one magnetic steel by generating a traveling-wave magnetic field when the at least one winding is energized, in order to drive a mover to move along the guide rails.

Each first position feedback device of the plurality of first position feedback devices is configured to sense a second position feedback device of a respective mover, in order to acquire relative position information between the respective mover and a respective primary unit.

The controller is configured to calculate absolute position information of the respective mover on the guide rails according to the relative position information, and to switch working modes of the respective primary unit according to the relative position information. The working modes include a position mode and a current mode. In the position mode, the controller is configured to output a position control instruction according to the absolute position information and predetermined positions of the respective mover within a full range of travel on the guide rails, and a respective driver is configured to adjust current in at least one winding of the respective primary unit according to the position control instruction, in order for the respective mover to move to a predetermined position. In the current mode, the controller is configured to output a current control instruction, and the respective driver is configured to provide current to the at least one winding of the respective primary unit according to the current control instruction, in order to compensate a thrust loss occurred in movement of the respective mover.

Some embodiments of the present disclosure provide a control method for a direct drive system, applicable to the direct drive system as illustrated above, including:
controlling a first position feedback device to sense a second position feedback device, in order to acquire relative position information between a respective mover and a respective primary unit;
calculating absolute position information of the respective mover on the guide rails according to the relative position information; and
switching the working modes of the respective primary unit according to the relative position information. Herein, the working modes include a position mode and a current mode. In the position mode, a position control instruction is output according to the absolute position information and predetermined positions of the respective mover within a full range of travel on the guide rails, in order for a respective driver to adjust current in at least one winding of the respective primary unit according to the position control instruction, and change thrust between the at least one winding and at least one magnetic steel of the respective mover, to move the respective mover to a predetermined position. In the current mode, a current control instruction is output, in order for the respective driver to provide current to the at least one winding according to the current control instruction, to compensate a thrust loss occurred in movement of the respective mover.

Some embodiments of the present disclosure provide an electronic device, including: a memory; and at least one processor. The memory is configured to store at least one program, which, when executed by the at least one processor, causes the at least one process to implement operations of the control method for the direct drive system as illustrated above.

Some embodiments of the present disclosure provide a computer readable storage medium, configured to store executable instructions, which, when executed by a processor, causes the process to implement operations of the control method for the direct drive system as illustrated above.

Compared with related technologies, the solution according to the present disclosure has the following beneficial effects.

The plurality of primary units are designed to have two working modes, i.e. the position mode and the current mode. In the position mode, a position control instruction is output according to the absolute position information of a mover on the guide rails and predetermined positions of the mover within a full range of travel on the guide rails, in order for a respective driver to adjust current in at least one winding of a respective primary unit according to the position control instruction, and change thrust between the at least one winding and at least one magnetic steel of the respective mover, to move the respective mover to a predetermined position. In the current mode, a current control instruction is output, in order for the respective driver to provide current to the at least one winding according to the current control instruction, to compensate a thrust loss occurred in movement of the respective mover, but not to control the position of the mover. In this way, the normal movement of the mover can be ensured by the position mode of the plurality of primary units, and the thrust loss occurred in movement of the mover can be effectively compensated by the current mode of the plurality of primary units, without need of customizing and modifying functions of the plurality of drivers, thereby improving the universality of the plurality of drivers.

BRIEF DESCRIPTION OF DRAWINGS

In order to provide a clearer explanation of the related technologies or the technical solution in the embodiments of the present disclosure, a brief description will be given to the accompanying drawings required in the description of the related technologies or embodiments of the present disclosure. It is obvious that the accompanying drawings in the following description are only some embodiments of the present disclosure, not all of them. For those skilled in the art, other drawings may be obtained based on these drawings without inventive works.

DETAILED DESCRIPTION OF EMBODIMENTS

In order to make the purpose, technical solution, and advantages of the present application more obvious and understandable, the following will provide a clear and complete description of the present disclosure in conjunction with the embodiments and accompanying drawings. The same or similar numerals throughout represent the same or similar components or components with the same or similar functions. It should be understood that the various embodiments of the present disclosure described below are only used to explain the present disclosure and are not intended to limit the present disclosure. That is to say, based on the various embodiments of the present disclosure, all other embodiments obtained by those skilled in the art without inventive works fall within the scope of protection of the present disclosure. In addition, the technical features involved in the various embodiments of the present disclosure described below may be combined with each other as long as they do not conflict with each other.

Figure 1:
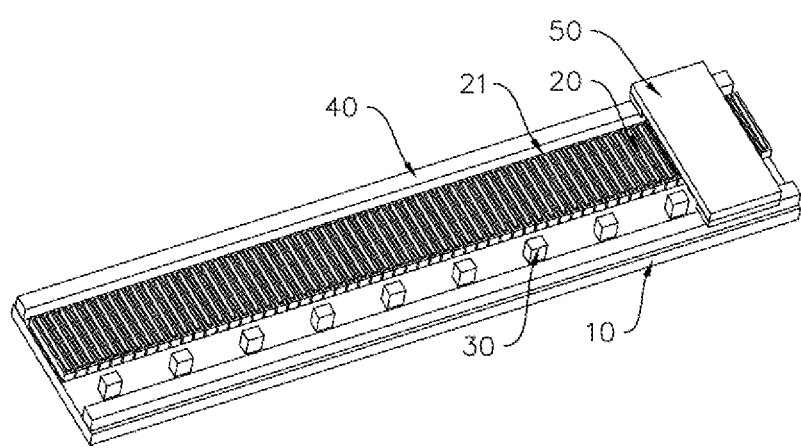
FIG. 1 is a structural diagram of the direct drive system according to some embodiments of the present disclosure.
Figure 2:
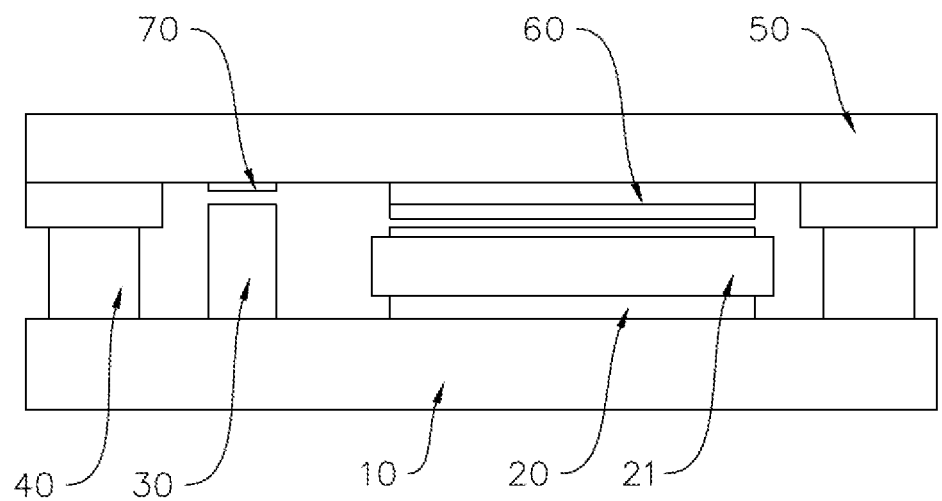
FIG. 2 is a side view of the direct drive system according to some embodiments of the present disclosure.

FIG. 1 is a structural diagram of the direct drive system according to some embodiments of the present disclosure, and FIG. 2 is a side view of the direct drive system according to some embodiments of the present disclosure. Some embodiments of the present disclosure provide a direct drive system, including: a stator 10; a plurality of primary units 20, each primary unit has at least one winding 21; a plurality of drivers (not shown in the drawings); a controller (not shown in the drawings); a plurality of first position feedback devices 30; guide rails 40; a plurality of movers 50; a plurality of magnetic steels 60 and a plurality of second position feedback devices 70. The plurality of primary units 20 are fixed to the stator 10 and arranged along a length direction of the stator 10. Each driver is connected to the at least one winding 21 of a respective primary unit 20. The controller is connected to the plurality of drivers. The plurality of first position feedback devices 30 are fixed to the stator 10, and each first position feedback device 30 is in correspondence to a respective primary unit 20 and is connected to a respective driver. The guide rails are fixed to the stator 10 and are disposed on either sides of any primary unit of the plurality of primary units 20. The plurality of movers 50 are slidably fitted to the guide rails 40, and each mover 50 has at least one magnetic steel 60 and a second position feedback device 70. The second position feedback device 70 aligns with a respective first position feedback device 30, and each winding 21 aligns with a respective magnetic steel 60. In some embodiments, each first position feedback device 30 is disposed in the middle of a respective primary unit 20, and the plurality of drivers are cascaded to the controller using high-speed bus.

When the direct drive system is in standby, an air gap magnetic field is generated between the magnetic steels 60 of a mover 50 and the windings 21 of a nearby primary unit 20. The driver outputs current to the windings 21, causing the windings 21 to generate a traveling-wave magnetic field, thereby generating thrust between the magnetic steels 60 of the mover 50 and the energized windings 21, and causing the mover 50 to move, along the guide rails 40, in the direction of the thrust. In practice, each first position feedback device 30 is configured to sense a second position feedback device 70, in order to acquire relative position information between the respective mover 50 and a respective primary unit 20. The controller is configured to calculate absolute position information of the respective mover 50 on the guide rails 40 according to the relative position information, and to switch working modes of the respective primary unit 20 according to the relative position information. The working modes include a position mode and a current mode. In the position mode, the controller is configured to output a position control instruction according to the absolute position information and predetermined positions of the respective mover 50 within a full range of travel on the guide rails 40, and a respective driver is configured to adjust current in at least one winding 21 of the respective primary unit according to the position control instruction, in order for the respective mover 50 to move to a predetermined position. In the current mode, the controller is configured to output a current control instruction, and the respective driver is configured to provide current to the at least one winding 21 of the respective primary unit according to the current control instruction, in order to compensate a thrust loss occurred in movement of the respective mover 50, but not to control the position of the mover. In some embodiments, the plurality of first position feedback devices 30 are reading heads, and the second position feedback device 70 is an incremental grid ruler including, but not limited to, a grating ruler and a magnetic grid ruler.

Figure 3:
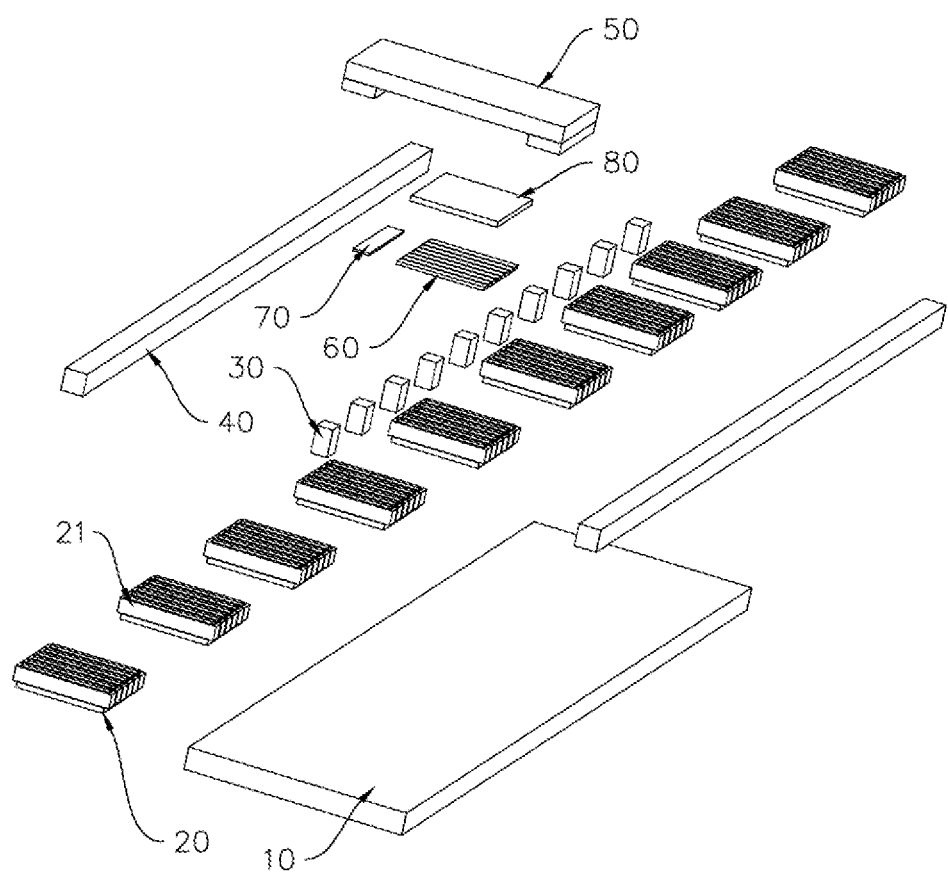
FIG. 3 is an exploded diagram of the direct drive system according to some embodiments of the present disclosure.

FIG. 3 is an exploded diagram of the direct drive system according to some embodiments of the present disclosure. In some embodiments, each mover 50 has a plurality of magnetic steels 60 and a second magnet 80, and the plurality of magnetic steels 60 are disposed on a side of the second magnet 80 away from the plurality of movers 50.

Figure 4:
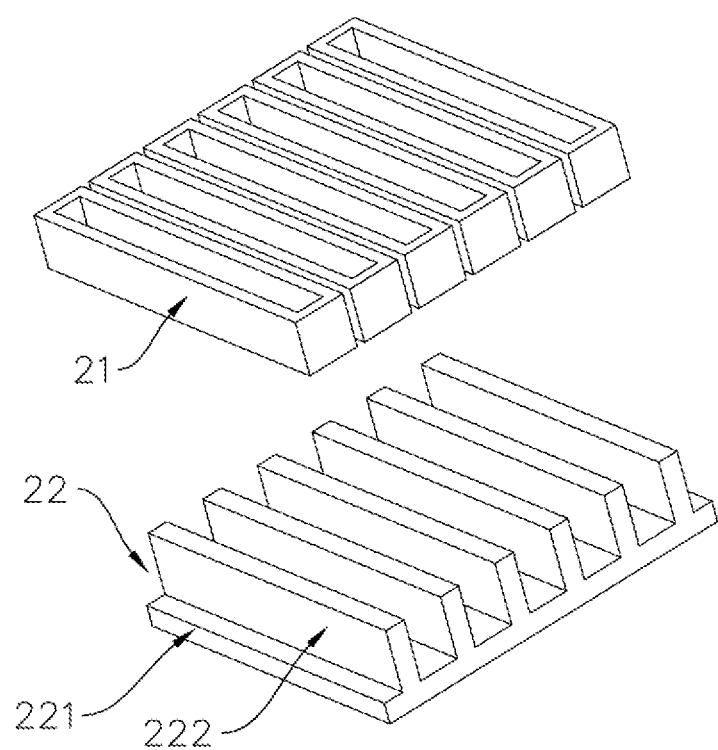
FIG. 4 is an exploded diagram of a primary unit according to some embodiments of the present disclosure.

Referring to FIG. 3, in some embodiments, each primary unit 20 further includes a first magnet 22 fixed to the stator 10, and the at least one winding 21 is disposed on a side of the first magnet 22 away from the stator 10. FIG. 4 is an exploded diagram of a primary unit according to some embodiments of the present disclosure, in some embodiments, each primary unit 20 includes a plurality of windings 21, the first magnet 22 includes a main body 221 fixed to the stator 10, a plurality of sleeve parts 222 extending in a direction away from the stator 10 and spaced from each other are formed on a side of the main body 221 away from the stator 10, and each winding 21 is sleeved on a respective sleeve part 222.

It should be noted by those skilled in the art that the above embodiments are only preferred embodiments of the present disclosure, and are not the only limitation on the described content. Those skilled in the art can flexibly set according to actual application scenarios based on the embodiments of the present disclosure.

The plurality of primary units 20 are designed to have two working modes, i.e. the position mode and the current mode. In the position mode, a position control instruction is output according to the absolute position information of a mover 50 on the guide rails 40 and predetermined positions of the mover 50 within a full range of travel on the guide rails 40, in order for a respective driver to adjust current in at least one winding 21 of a respective primary unit 20 according to the position control instruction, and change thrust between the at least one winding 21 and at least one magnetic steel 60 of the respective mover, to move the respective mover 50 to a predetermined position. In the current mode, a current control instruction is output, in order for the respective driver to provide current to the at least one winding 21 according to the current control instruction, to compensate a thrust loss occurred in movement of the respective mover 50, but not to control the position of the mover 50. In this way, the normal movement of the mover 50 can be ensured by the position mode of the plurality of primary units 20, and the thrust loss occurred in movement of the mover 50 can be effectively compensated by the current mode of the plurality of primary units 20, without need of customizing and modifying functions of the plurality of drivers, thereby improving the universality of the plurality of drivers. Moreover, both the position control instruction and the current control instruction are sent by the controller, speed fluctuations caused by the thrust on a mover 50 coming from different primary units 20 can be effectively prevented.

Figure 5:
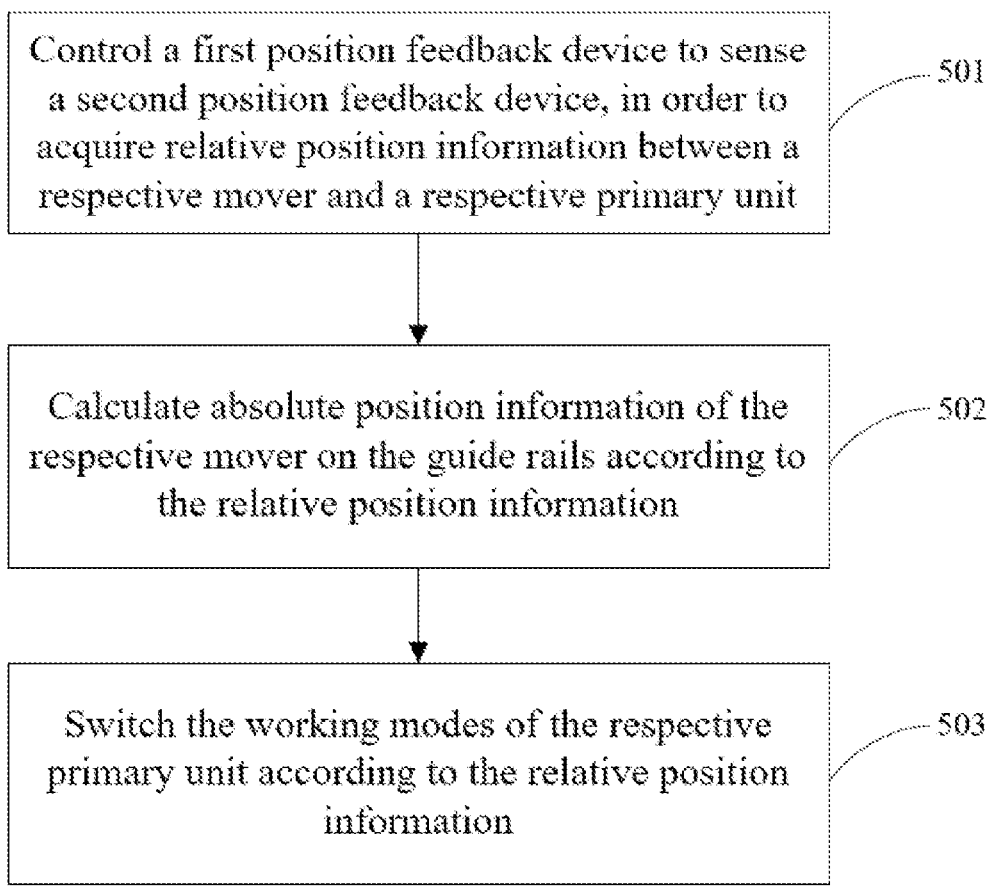
FIG. 5 is a flowchart of the control method for the direct drive system according to some embodiments of the present disclosure.

FIG. 5 is a flowchart of the control method for the direct drive system according to some embodiments of the present disclosure. Some embodiments of the present disclosure provide a control method for a direct drive system, applicable to the direct drive system as provided by the above embodiments. The method includes the following operations 501 to 503.

At 501, a first position feedback device is controlled to sense a second position feedback device, in order to acquire relative position information between a respective mover and a respective primary unit.

In use of the direct drive system according to some embodiments of the present disclosure, a first position feedback device 30 corresponding to a respective primary unit 20 is used to sense a second position feedback device 70 on a mover 50 sliding along the guide rails 40, thereby acquiring the relative position information between the mover 50 and the respective primary unit 20.

At 502, absolute position information of the respective mover on the guide rails is calculated according to the relative position information.

After acquiring the relative position information between the mover 50 and the respective primary unit 20, the absolute position information of the mover 50 on the guide rails 40 is calculated according to the acquired relative position information. It should be understood that the respective primary unit 20 and the guide rails 40 are fixed on the stator 10, only the mover 50 slides along the guide rails 40. Therefore, the absolute position information of the mover 50 on the guide rails 40 can be calculated according to the relative position information between the mover 50 and the respective primary unit 20.

At 503, the working modes of the respective primary unit are switched according to the relative position information.

After calculating absolute position information of the mover 50 on the guide rails 40, the working modes of the respective primary unit 20 are switched according to the relative position information. The working modes include a position mode and a current mode. In the position mode, a position control instruction is output according to the absolute position information of the mover 50 on the guide rails 40 and predetermined positions of the mover 50 within a full range of travel on the guide rails 40, in order for a respective driver to adjust current in at least one winding 21 of the respective primary unit 20 according to the position control instruction, and change thrust between the at least one winding 21 and at least one magnetic steel 60 of the respective mover, to move the mover 50 to a predetermined position. In the current mode, a current control instruction is output, in order for the respective driver to provide current to the at least one winding 21 according to the current control instruction, to compensate a thrust loss occurred in movement of the respective mover 50, but not to control the position of the mover 50.

Figure 6:
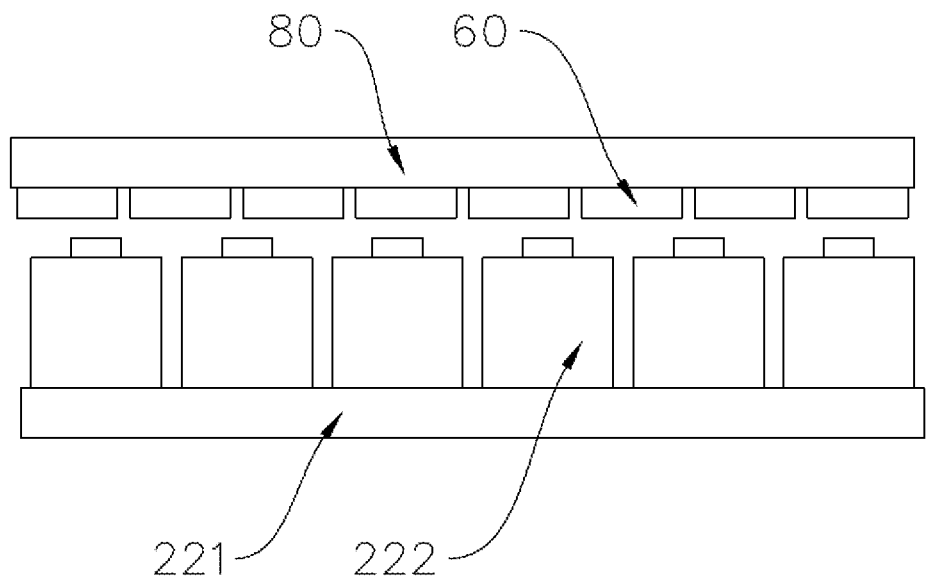
FIG. 6 is a schematic diagram of a first relative position between a primary unit and a magnetic steel according to some embodiments of the present disclosure.
Figure 7:
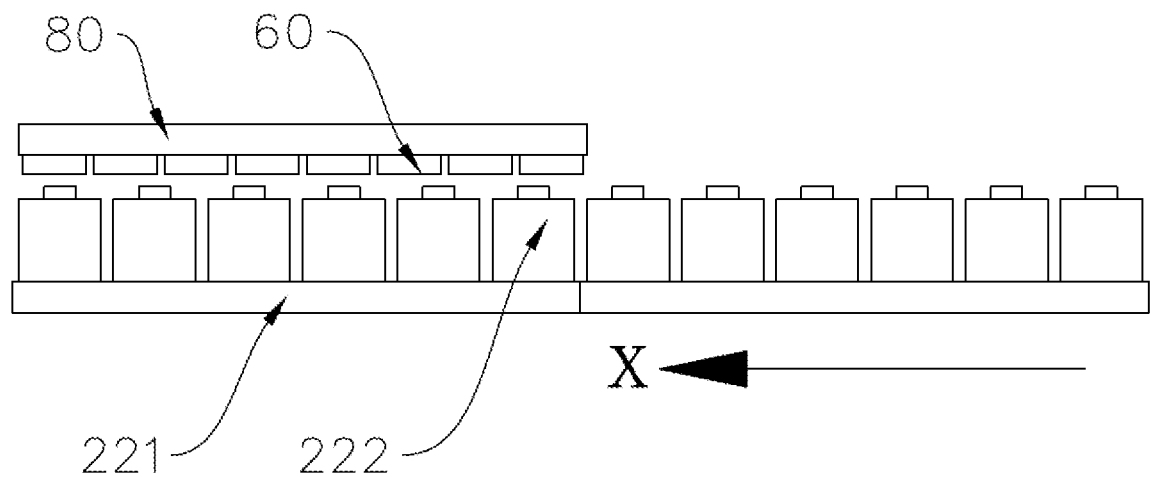
FIG. 7 is a schematic diagram of a second relative position between the primary unit and the magnetic steel according to some embodiments of the present disclosure.
Figure 8:
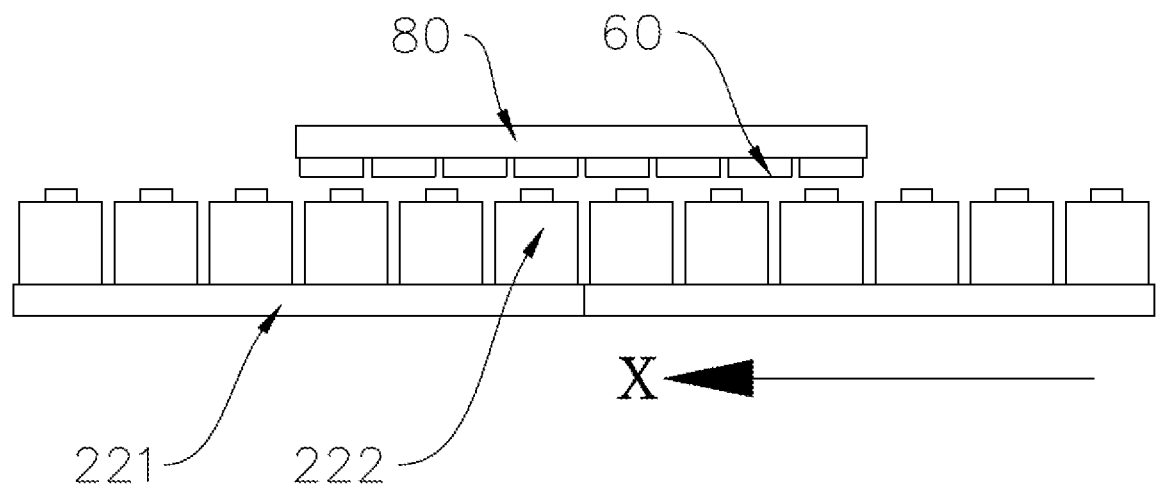
FIG. 8 is a schematic diagram of a third relative position between the primary unit and the magnetic steel according to some embodiments of the present disclosure.

In some embodiments, referring to FIG. 6, the operation 503 may include: when the at least one magnetic steel 60 completely enters the respective primary unit 20 (i.e., a projection of outer edges of the at least one magnetic steel 60 on the respective primary unit 20 is surrounded by outer edges of the respective primary unit 20), a working mode of the respective primary unit 20 is switched to the position mode. Referring to FIG. 7 (x represents the moving direction of the at least one magnetic steel 60), when the at least one magnetic steel 60 completely leaves a primary unit 20 preceding the respective primary unit and moves to the respective primary unit 20 (the current primary unit), a working mode of the primary unit 20 preceding the respective primary unit is switched to the current mode, and the working mode of the respective primary unit 20 is switched to the position mode. Referring to FIG. 8 (x represents the moving direction of the at least one magnetic steel 60), when the at least one magnetic steel 60 is located between the primary unit 20 preceding the respective primary unit and the respective primary unit 20, the working modes of the two primary units 20 are switched to the position mode; or the working mode of one primary unit of the two primary units 20 is switched to the position mode, and the working mode of the other primary unit 20 is switched to the current mode.

It should be noted by those skilled in the art that the above embodiments are only preferred embodiments of the present disclosure, and are not the only limitation on the described content. Those skilled in the art can flexibly set according to actual application scenarios based on the embodiments of the present disclosure.

Figure 9:
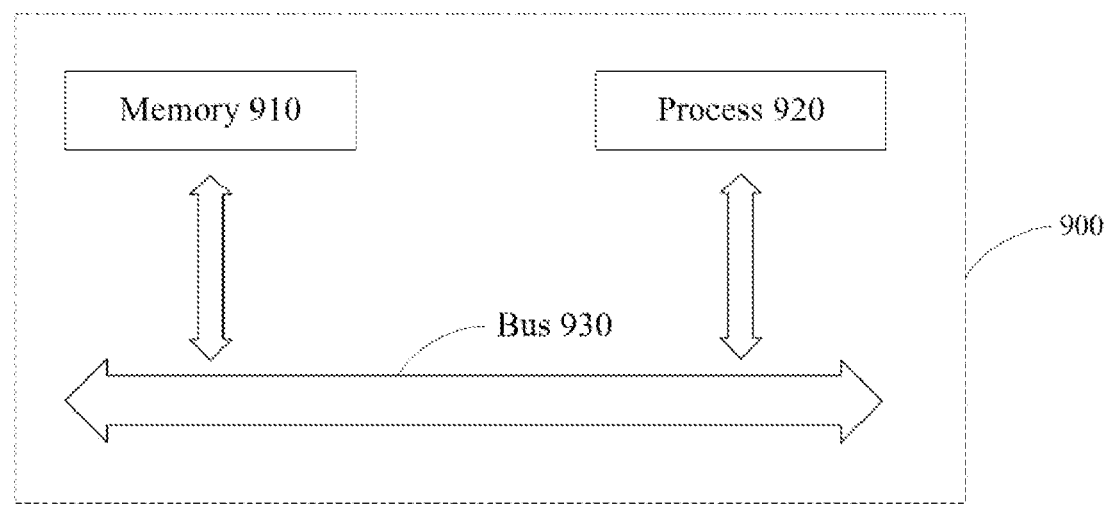
FIG. 9 is a block diagram of modules of the electronic device according to some embodiments of the present disclosure.

FIG. 9 is a block diagram of modules of the electronic device according to some embodiments of the present disclosure. Some embodiments of the present disclosure provide an electronic device 900, including: a memory 910 and at least one processor 920. The memory 910 is configured to store at least one program, which, when executed by the at least one processor 920, causes the at least one process 920 to implement operations of the control method for the direct drive system as provided by the above embodiments.

In some embodiments, the electronic device 900 includes bus 930 configured for the communication connection between the memory 910 and the at least one processor 920.

Figure 10:
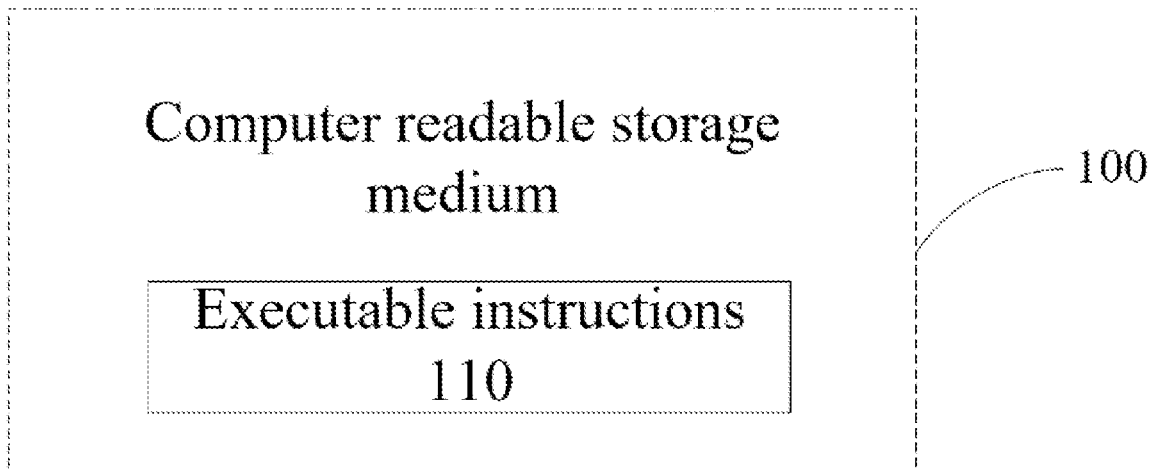
FIG. 10 is a block diagram of modules of the computer readable storage medium according to some embodiments of the present disclosure.

FIG. 10 is a block diagram of modules of the computer readable storage medium according to some embodiments of the present disclosure. Some embodiments of the present disclosure provide a computer readable storage medium 100, configured to store executable instructions 110, which, when executed by a processor (i.e. called by the processor), causes the process to implement operations of the control method for the direct drive system as provided by the above embodiments.

Figure 11:
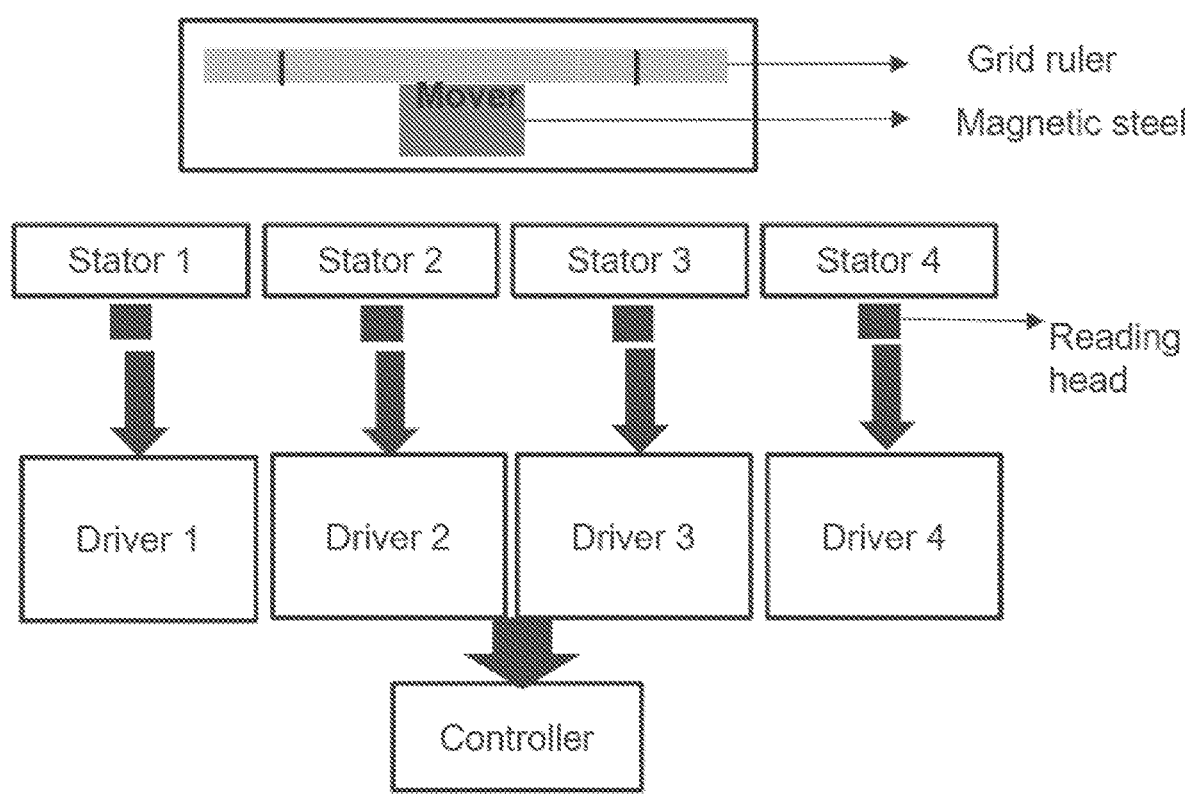
FIG. 11 is a structural diagram of the direct drive system according to some embodiments of the present disclosure.

FIG. 11 is a structural diagram of the direct drive system according to some embodiments of the present disclosure. FIG. 11 exemplarily shows relative spatial position relationships among the stators, the mover, the plurality of drivers and the controller in the direct drive system according to some embodiments of the present disclosure.

The operations of the method or algorithm described in reference to the disclosed embodiments of the present disclosure may be directly implemented using hardware, software modules executed by processors, or a combination thereof. Software modules may be stored in random access memory (RAM), memory, read-only memory (ROM), electrically programmable ROM, electrically erasable programmable ROM, register, hard disk, removable disk, CD-ROM, or any other form of storage medium known in the art.

The above embodiments may be fully or partially implemented through software, hardware, firmware, or any combination thereof. When implemented using software, the above embodiments may be fully or partially implemented in the form of computer program products. Computer program products include one or more computer instructions. When loading and executing the computer program instructions on a computer, all or part of the processes or functions described in the present disclosure are generated. Computers may be general-purpose computers, specialized computers, computer networks, or other programmable devices. Computer instructions may be stored in a computer-readable storage medium, or transmitted from one computer-readable storage medium to another. For example, computer instructions may be transmitted from a website site, computer, server, or data center to another website site, computer, server or data center through wired (such as coaxial cable, fiber optic, digital user line) or wireless (such as infrared, wireless, microwave, etc.) methods. A computer-readable storage medium may be any available medium that a computer can access, or a data storage device such as a server or data center that contains one or more available mediums. The available medium may be magnetic medium (such as floppy disks, hard drives, magnetic tapes), optical medium (such as DVDs), or semiconductor medium (such as solid state hard drives).

It should be noted that each embodiment in the content of the present disclosure is described in a progressive manner, and each embodiment focuses on the differences from other embodiments. The same and similar parts of embodiments may be referred to each other. For product embodiments, due to their similarity to method embodiments, the description is relatively simple. Reference may be made to partial description of the method embodiments for relevant information.

It should also be noted that in the content of the present disclosure, relational terms such as first and second are only used to distinguish one entity or operation from another entity or operation, and do not necessarily require or imply any actual relationship or order between these entities or operations. Moreover, the terms "including", "comprising", or any other variation thereof are intended to encompass non-exclusive inclusion, such that a process, method, item, or device that includes a series of elements not only includes those elements, but also other elements that are not explicitly listed, or further includes elements inherent in such a process, method, item, or device. Without further limitations, the elements limited by the statement "including a . . . " do not exclude the existence of other identical elements in the process, method, item, or device that includes the elements.

The above description of the disclosed embodiments enables those skilled in the art to implement or use the content of the present disclosure. The various modifications to these embodiments will be apparent to those skilled in the art, and the general principles defined in the present disclosure may be implemented in other embodiments without departing from the spirit or scope of the present disclosure. Therefore, the content of the present disclosure should not be limited to the embodiments disclosed in the content of the present disclosure, but rather to the broadest range consistent with the principles and novel features disclosed in the content of the present disclosure.

What is claimed is:

1. A direct drive system, comprising:
   a stator;
   a plurality of primary units fixed to the stator and arranged along a length direction of the stator, wherein each primary unit of the plurality of primary units has at least one winding;
   a plurality of drivers, wherein each driver of the plurality of drivers is connected to the at least one winding of a respective primary unit;
   a controller connected to the plurality of drivers;
   a plurality of first position feedback devices fixed to the stator, wherein each first position feedback device of the plurality of first position feedback devices is in correspondence to a respective primary unit and connected to a respective driver;
   guide rails fixed to the stator and disposed on either sides of any primary unit of the plurality of primary units; and
   a plurality of movers slidably fitted to the guide rails, wherein each mover of the plurality of movers has at least one magnetic steel and a second position feedback device;
   wherein the second position feedback device aligns with a respective first position feedback device, and each winding of the at least one winding aligns with a respective magnetic steel;
   wherein the at least one winding is configured to generate thrust between the at least one winding and the at least one magnetic steel by generating a traveling-wave magnetic field when the at least one winding is energized, in order to drive a mover to move along the guide rails;
   wherein each first position feedback device of the plurality of first position feedback devices is configured to sense a second position feedback device of a respective mover, in order to acquire relative position information between the respective mover and a respective primary unit;
   the controller is configured to calculate absolute position information of the respective mover on the guide rails according to the relative position information, and to switch working modes of the respective primary unit according to the relative position information;
   wherein the working modes comprise a position mode and a current mode;
   when a projection of outer edges of the at least one magnetic steel on the respective primary unit is surrounded by outer edges of the respective primary unit, the working mode of the respective primary unit is switched to the position mode;
   when the at least one magnetic steel completely leaves a primary unit preceding the respective primary unit and moves to the respective primary unit, the working mode of the primary unit preceding the respective primary unit is switched to the current mode, and the working mode of the respective primary unit is switched to the position mode;
   when the at least one magnetic steel is located between the primary unit preceding the respective primary unit and the respective primary unit, the working modes of the primary unit preceding the respective primary unit and the respective primary unit are both switched to the position mode; or switch the working mode of one primary unit of the primary unit preceding the respective primary unit and the respective primary unit to the position mode, and switch the working mode of the other primary unit to the current mode;
   in the position mode, the controller is configured to output a position control instruction according to the absolute position information and predetermined positions of the respective mover within a full range of travel on the guide rails, and a respective driver is configured to adjust current in at least one winding of the respective primary unit according to the position control instruction, in order for the respective mover to move to a predetermined position; and
   in the current mode, the controller is configured to output a current control instruction, and the respective driver is configured to provide current to the at least one winding of the respective primary unit according to the current control instruction, in order to compensate a thrust loss occurred in movement of the respective mover.

2. The direct drive system according to claim 1, wherein each primary unit of the plurality of primary units further comprises a first magnet fixed to the stator, and the at least one winding is disposed on a side of the first magnet away from the stator.

3. The direct drive system according to claim 2, wherein each primary unit of the plurality of primary units comprises a plurality of windings, the first magnet comprises a main body fixed to the stator, a plurality of sleeve parts extending in a direction away from the stator and spaced from each other are formed on a side of the main body away from the stator, and each winding of the plurality of windings is sleeved on a respective sleeve part.

4. The direct drive system according to claim 1, wherein each mover of the plurality of movers has a plurality of magnetic steels and a second magnet, and the plurality of magnetic steels are disposed on a side of the second magnet away from the plurality of movers.

5. The direct drive system according to claim 1, wherein the plurality of first position feedback devices are reading heads.

6. The direct drive system according to claim 1, wherein the second position feedback device is an incremental grid ruler.

7. The direct drive system according to claim 6, wherein the incremental grid ruler is a grating ruler or a magnetic grid ruler.

8. A control method for a direct drive system, applicable to the direct drive system according to claim 1, including:
   controlling a first position feedback device to sense a second position feedback device, in order to acquire relative position information between a respective mover and a respective primary unit;
   calculating absolute position information of the respective mover on the guide rails according to the relative position information; and
   switching the working modes of the respective primary unit according to the relative position information, comprising:
   in response to a projection of outer edges of the at least one magnetic steel on the respective primary unit being surrounded by outer edges of the respective primary unit, switching a working mode of the respective primary unit to the position mode;
   in response to the at least one magnetic steel completely leaving a primary unit preceding the respective primary unit and moving to the respective primary unit, switching a working mode of the primary unit preceding the respective primary unit to the current mode, and switching the working mode of the respective primary unit to the position mode;

in response to the at least one magnetic steel being located between the primary unit preceding the respective primary unit and the respective primary unit, switching the working modes of the primary unit preceding the respective primary unit and the respective primary unit to the position mode; or switching the working mode of one primary unit of the primary unit preceding the respective primary unit and the respective primary unit to the position mode, and switching the working mode of the other primary unit to the current mode;

wherein the working modes comprise a position mode and a current mode;

in the position mode, outputting a position control instruction according to the absolute position information and predetermined positions of the respective mover within a full range of travel on the guide rails, in order for a respective driver to adjust current in at least one winding of the respective primary unit according to the position control instruction, and change thrust between the at least one winding and at least one magnetic steel of the respective mover, to move the respective mover to a predetermined position; and in the current mode, outputting a current control instruction, in order for the respective driver to provide current to the at least one winding according to the current control instruction, to compensate a thrust loss occurred in movement of the respective mover.

9. An electronic device, comprising:

a memory; and at least one processor;

wherein the memory is configured to store at least one program, which, when executed by the at least one processor, causes the at least one process to implement operations of the method according to claim 8.

10. A computer readable storage medium, configured to store executable instructions, which, when executed by a processor, causes the process to implement operations of the method according to claim 8.

* * * * *